Oct. 5, 1943.　　　　　H. Z. GORA　　　　　2,330,881
VALVE
Filed Aug. 2, 1940
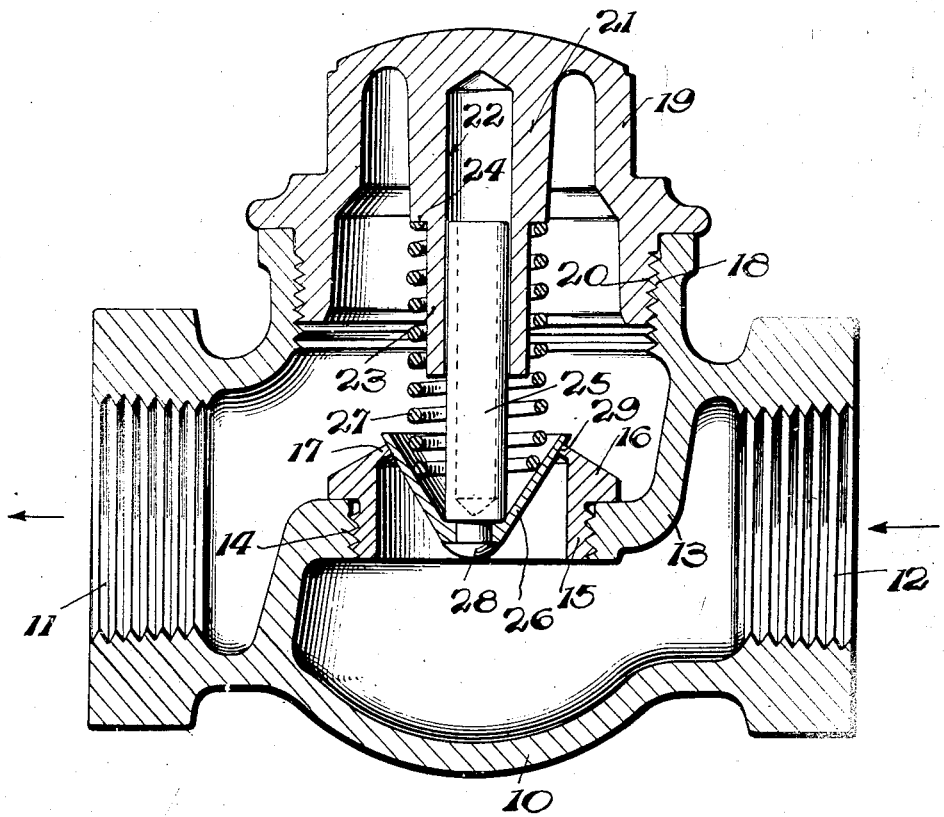
Inventor
Henry Z. Gora.
By Cameron, Kerkam + Sutton
Attorneys Patented Oct. 5, 1943

2,330,881

UNITED STATES PATENT OFFICE 2,330,881

VALVE

Henry Z. Gora, Bridgeport, Conn., assignor to Jenkins Bros., New York, N. Y., a corporation of New Jersey Application August 2, 1940, Serial No. 349,551

3 Claims. (Cl. 251—144)

This invention relates to valves. While the invention has particular utility when embodied in check valves and will be exemplified by its use in check valves for air compressors, it is to be expressly understood that it is not limited to check valves. Therefore in referring to check valves, and particularly check valves for air compressors, to explain the principles of operation and advantages of the present invention it is to be understood that such is done by way of illustration through use of a concrete example.

Air compressor check valves as commonly supplied to the trade have flat seating faces, both the valve member and its seat are of metal, and the valve member is of relatively heavy construction. Such a flat disk valve construction using a metal to metal contact becomes leaky early in its service, and is also noisy, and efforts heretofore made to overcome these objections have not proved satisfactory.

It has heretofore been proposed to provide the valve member with a seating face composed of a semihard rubber compound or the like which is backed by the metal body of the valve member, but structures of this latter type have not proven satisfactory because the composite valve member so formed is too heavy, and breaks down under the rapid pulsations encountered in service, while the average check valve operates under a temperature which is injurious to such nonmetallic facing material. It has also been proposed to make the valve member in the form of a relatively lightweight metal disk, on the order of one sixteenth inch thickness, seating on a nonmetallic seat ring, but experience has demonstrated that such seat rings of nonmetallic material are not satisfactory because they will not stand the temperatures of ordinary service. It has also been proposed to use such a lightweight metal disk in conjunction with a metal seat ring, but such has not proved satisfactory because, in addition to the increase of noise, the valve has proved leaky after a very short period of service, the flat surfaces tending to carbonize due to oil in suspension in the hot air and a valve constructed as just referred to not dissipating the carbon.

It is an object of this invention to provide a valve which will overcome the foregoing difficulties.

Another object of this invention is to provide a valve which is so constructed as to be relatively light in weight and yet assure that it will seat tightly.

Another object of this invention is to provide a valve which minimizes noise though employing a metal to metal contact.

Another object of this invention is to provide a valve which minimizes the difficulties heretofore experienced from deposits on the valve member or its seat.

Another object of this invention is to provide a valve which is so constructed as to wipe off any particles of foreign matter that may adhere to the valve member or its seat.

Another object of this invention is to provide a valve which assures perfect annular contact because of the construction of the valve member and its seat even though under manufacturing tolerances there may not be precise conformity between the contacting surfaces.

Another object of this invention is to provide a valve which tends to produce a stream-line flow, to reduce friction and decrease the temperature.

Other objects of the invention will appear as the description thereof proceeds.

The invention is capable of receiving a variety of mechanical expressions, one of which is illustrated on the accompanying drawing, but it is to be expressly understood that the drawing is for purposes of illustration only and is not intended to be a definition of the invention.

The drawing illustrates an axial section of a preferred embodiment of the invention as applied to a check valve.

As shown, 10 is a valve body or casing such as is well known in the art in conjunction with lift type or poppet type check valves, as commonly used in air compressors, said housing being of any suitable size, form and construction and provided with nipples 11 and 12 for attachment to the usual conduits. Interiorly, casing 10 is provided with a partition 13, here shown as having a threaded aperture 14 in which is mounted the threaded portion 15 of a valve seat member 16 having a valve seat formed by a relatively thin inwardly directed flange 17 extending at an angle to the axis of said member. Valve casing 10 also has an interiorly threaded aperture 18 in which is received the cap 19 threaded at 20 to cooperate with the threads 18. Cap 19 has an inwardly directed sleevelike portion 21 provided with an axially extending bore 22, while exteriorly said sleevelike portion 21 is reduced diametrically at 23 to provide a shoulder 24. Reciprocatingly mounted in the bore 23 is the stem 25 of the valve member 26, and reacting between said valve member 26 and the shoulder 24 is a coil spring 27 which is centered by the portion 23 of the sleeve 21 and which normally urges the valve member 26 into contact with seat member 16. If desired the stem and bore may be noncircular in cross-section, or have any other suitable form.

Valve member 26, in conformity with the present invention, takes the form of a hollow conical member having a wall which preferably is tapered in thickness toward its free edge to be thinner thereat, and is constructed of relatively light metal so as to be flexible and resilient.

I have discovered that there is a critical thickness for the wall of this valve member if optimum results, as herein explained, are to be obtained. This thickness of the wall of the valve member will necessarily vary with the pressure acting on the valve member, the size of the valve member and the characteristics of the metal used. Employing a tempered steel having a tensile strength of approximately 120,000 pounds per square inch, and using a factor of safety of 12, optimum results were obtained through use of the formula hereinafter set forth. This factor of safety of 12 was found to be the most efficient value for the particular material used, but depending upon the conditions existing in a given installation, the tensile strength and other characteristics of the metal to be used, etc., one may vary this factor of safety, making it larger or smaller as the exigencies of different installations may render desirable, within the range of 2 to 24.

I have found that optimum results are obtained by using the formula $$t = \frac{d \times \sqrt{P}}{A}$$

where $$A = \left(\frac{7704}{F}\right) \times \left(\frac{T}{120,000}\right)$$

and $t$ = thickness of the wall of the valve member approximately where it contacts the seat,
$F$ = factor of safety,
$T$ = tensile strength of material used,
$P$ = working pressure, pounds per square inch,
$d$ = diameter of cone at thickness $t$, and
7704 is an experimentally determined constant.

Changes of material, as understood in the art, will obviously suggest the desirability of changes in the factor of safety. The material remaining the same, changes in the factor of safety within the range of 2 to 24 have been found to give improved results, but in the case of the aforesaid tempered steel there was a decrease in efficiency as the factor of safety departed from 12 on either side.

Where as shown the lip of the conical valve member, when the valve member is in contact with its seat, extends but a relatively short distance above the valve seat member, and as shown the conicity of the valve member is on the order of 35 to 40°, the value $t$ may be taken as the edge thickness, notwithstanding a small taper in the thickness of the wall of the valve member, without substantially altering the results obtained.

Valve member 26 may be cast integrally with the stem 25, or it may be formed as a separate piece in any suitable way and suitably attached to the stem 25 as by heading over a reduced extension 28 on said stem. The valve seat proper 29 provided by the flange 17 is preferably beveled so as to be parallel to the conical wall of the valve member 26, while the flange itself preferably extends substantially at right angles to the conical wall of said valve member. Flange 17 is also preferably made as thin as can be safely done in view of the pressures to be encountered. The thickness of the lip constituted by the flange 17 will vary with the pressure and must be sufficiently stout to prevent distortion under the existing pressures but otherwise it is made as thin as feasible. The maximum diameter of the valve member 26 exceeds the diameter of the seat 29 for a purpose that will appear hereinafter.

Owing to the construction of the valve member 26 as above described, it possesses sufficient flexibility to make a perfect annular contact with the seat 29 even though, owing to manufacturing tolerances, there be an absence of complete conformity in their cross-sections at the seating portion. At the same time the valve member is relatively light in weight so that a contact of the metal valve member with its seat is accompanied by a minimum of noise. When the valve member is seated there is only a narrow zone of contact between said member and its seat and as the seat preferably has the same conicity as said valve member its inner or lower face will act as a scraping edge to remove any particles of foreign matter adhering to the valve member adjacent its seating portion when the latter is withdrawn from its seat. Similarly any foreign matter adhering to the valve member adjacent its seating portion while the valve is open and which might interfere with proper seating will be wiped off as the valve member approaches its seat by the scraping edge, provided by the outer or upper face of said flange 17, acting on the valve member. So also the valve member tends to clean the seat 29. At the same time the conical shape of the valve member tends to produce stream-line flow, with consequent reduction of friction and of temperature. The valve member and its seat may be inexpensively fabricated and may be readily renewed when and if undue wear develops.

Experience has demonstrated that a valve constructed as heretofore described largely if not entirely eliminates the objections heretofore encountered with check valves, such for example as ordinarily supplied on air compressors, and the difficulties and disadvantages heretofore encountered in attempting to meet these objections by use of nonmetallic surfaces on the valve member or the valve seat member or both, or by employing relatively light, flat valve members, have been avoided. The valve member will tightly engage its seat, the flexibility and elasticity of the valve member providing for such deflection of the valve member as is necessary to effect 360° of sealing contact, and therefore a tighter seating is provided under manufacturing tolerances. The valve member is self-cleaning, and therefore it does not become leaky because of carbon deposits or adherence of foreign particles on the valve member or the seat even after relatively long periods of service. It is resistant of wear and therefore durable, it reduces friction to fluid flow, it is relatively quiet in operation, and it is inexpensive to manufacture, install, maintain and replace. The relatively long guiding surface which exists between the stem and its guide sleeve assures that the valve member is properly guided into and out of its seating position.

While the embodiment of the invention illustrated on the drawing has been described with considerable particularity it is to be understood that the invention is not restricted to the embodiment illustrated, as other embodiments of the invention will now suggest themselves to those skilled in the art, and changes may be made in the details of the construction, arrangement, proportion of parts, etc., without departing from the spirit of this invention. While the invention has particular utility when applied to check valves, it is possessed of wider utility, as will be apparent to those skilled in the art, and has in fact been successfully employed with other types of valves than check valves. Reference is therefore to be had to the appended claims for a definition of this invention.

What is claimed is:

1. In a valve, the combination of a valve seat member having a passage therethrough and an inwardly extending relatively thin metal flange overhanging said passage and inclined with respect to the axis thereof, said flange terminating at its extremity in a relatively narrow annular valve seat which is inclined with respect to the axis of said passage, and a metal valve member in the form of a hollow cone co-operating with said seat and adapted to engage said seat adjacent the end of said valve member which is of larger cross section, the lateral wall of said hollow conical valve member having the same conicity as said valve seat so that said seat makes face contact with the conical wall of said valve member and said lateral wall being tapered in thickness substantially throughout its length and being relatively thin where it engages said seat whereby said valve member is flexible to conform with said seat under the closing force acting on said valve member.

2. In a valve, the combination of a valve seat member having a passage therethrough and an inwardly extending relatively thin metal flange overhanging said passage and inclined with respect to the axis thereof, said flange terminating at its extremity in a relatively narrow annular valve seat which is inclined with respect to the axis of said passage, said flange extending at substantially a right angle to the conical surface of said valve seat, and a metal valve member in the form of a hollow cone co-operating with said seat and adapted to engage said seat adjacent the end of said valve member which is of larger cross section, the lateral wall of said hollow conical valve member having the same conicity as said valve seat so that said seat makes face contact with the conical wall of said valve member and said lateral wall being tapered in thickness substantially throughout its length and being relatively thin where it engages said seat whereby said valve member is flexible to conform with said seat under the closing force acting on said valve member.

3. In a valve, the combination of a valve seat member having a passage therethrough and provided with a relatively thin flange terminating at its extremity in a relatively narrow annular valve seat which is inclined with respect to the axis of said passage, and a metal valve member in the form of a hollow cone co-operating with said seat and adapted to engage said seat adjacent the end of said valve member which is of larger cross section, the lateral wall of said hollow conical valve member having the same conicity as said valve seat so that said seat makes face contact with the conical wall of said valve member, said lateral wall being flexible where it engages said seat and having its thickness at said seat determined by the ratio of the product of the diameter of said valve member at its seat-engaging portion and the square root of the pressure acting on said valve member to a numerical value which is proportional to the tensile strength of the material and inversely proportional to the factor of safety.

HENRY Z. GORA.